UNITED STATES PATENT OFFICE.

EDWARD HART, OF EASTON, PENNSYLVANIA.

UTILIZATION OF GREENSAND.

1,322,900.  Specification of Letters Patent.  Patented Nov. 25, 1919.

No Drawing.  Application filed January 8, 1917. Serial No. 141,225.

*To all whom it may concern:*

Be it known that I, EDWARD HART, a citizen of the United States, residing at Easton, county of Northampton, and State of Pennsylvania, have invented certain new and useful Improvements in the Utilization of Greensand, of which the following is a full, clear, and exact description.

The present invention relates to the production of valuable compounds from greensand, and relates particularly to the production of potash alum, $KAl(SO_4)_2.12H_2O$, aluminum sulfate, potassium sulfate, or other salts of potassium and aluminum, with the recovery of a considerable portion of the acid employed in the process.

I have found after careful investigation that ordinary greensand consists largely of ordinary sand (silica), the grains of which are covered with thin layers of glauconite, and that this glauconite can readily be removed from the sand by tumbling the greensand in a dry state. To this end I place the greensand in a tumbling barrel of any ordinary construction, and rotate the same until the major portion of the glauconite has been reduced to a fine powder, which can then be removed from the grains of sand by sifting or by blowing operations. The sand, that is to say the coarse material, is then discarded.

Analyses of three samples of the glauconite (after purification) gave the following results:

|  | 1. | 2. | 3. |
|---|---|---|---|
| $SiO_2$ | 51.40 | 51.43 | 51.39 |
| $Fe_2O_3$ | 20.65 | 20.78 | 20.71 |
| FeO | 1.43 | 1.40 | 1.51 |
| $Al_2O_3$ | 8.71 | 8.63 | 8.80 |
| CaO | 0.92 | 1.03 | 0.87 |
| MgO | 2.16 | 2.27 | 2.24 |
| $K_2O$ | 8.33 | 8.40 | 8.20 |
| $Na_2O$ | 0.21 | 0.27 | 0.25 |
| $H_2O$ | 5.57 | 5.53 | 5.60 |

The finely powdered material, which consists essentially of glauconite, is mixed with oil of vitriol (sulfuric acid of about 66° Bé.) The material is then allowed to stand for several hours in a warm place, during which time the acid attacks the iron compounds, aluminum compounds, potassium compounds, calcium compounds and magnesium compounds. Oxidation will be effected by the action of air during this period, converting the ferrous compounds to the ferric state. These materials are converted in part at least, into sulfates. After allowing to stand for several hours, the mass is then placed in an ordinary salt cake furnace of the muffle type, and is heated until the entire mass has reached a temperature of 550 to 750° C., preferably a temperature of about 600° C. being employed, since this temperature has been found to give the most satisfactory results. This heating operation decomposes the sulfates of iron, liberating sulfur trioxid, which is driven off in the form of vapor and may subsequently be treated for the recovery of sulfuric acid by any of the ordinary processes. At this temperature the aluminum sulfate, potassium sulfate, calcium sulfate and magnesium sulfate are not materially affected, and are not, to any material extent decomposed.

The heated material is then drawn from the furnace and quenched with water, and is allowed to stand for several weeks, being sprinkled from time to time to keep it damp. Under this treatment the anhydrous aluminum sulfate becomes hydrated. The mass is then lixiviated with boiling water which dissolves out soluble sulfates of aluminum and potassium, together with whatever magnesium sulfate is present. This solution is drawn off from the insoluble material containing substantially all of the iron in the form of insoluble oxid, and is then cooled and the alum crystallized out. This may leave an excess of aluminum sulfate or of potassium sulfate in the solution. The oxid of iron is found to be in the form of a very fine powder and can be recovered for use as a pigment.

It will be noted that in this process, I do not treat the entire greensand, but first separate the valuable material, that is the glauconite, by a grinding or abrading operation. It will further be noted that in the heating operation, I decompose substantially all of the iron sulfates which would interfere with the crystallization of substantially pure alum, and that the iron is produced in the form of an oxid suitable for use as pigment.

In the treatment of the glauconite material with acid, and allowing the first reaction to take place, I preferably employ a temperature of about 600° C., although other temperatures may be employed.

In the hydration operation, the mass stands at or about ordinary room temperature.

In place of sulfuric acid, a solution of niter cake may be employed, or a mixture of niter cake solution and sulfuric acid. Other acids may also be employed.

In using niter cake or other acids, the process will naturally be modified more or less.

What I claim is:

1. A process of treating greensand which comprises separating the same into fractions consisting essentially of sand and glauconite respectively, adding to the glauconite fraction an acid capable of reacting thereupon to convert the potassium, aluminum, and iron contents of the glauconite, at least in major part, into salts of potassium, aluminum and iron allowing the mixture to stand in a warm state until at least a material proportion of the potassium, aluminum and iron present have been converted into salts of such acid, heating the mass to a temperature capable of producing a mixture containing the undecomposed soluble potassium and aluminum salts but substantially free from soluble iron salts, adding water to the mass and keeping the mass moist for a sufficient time to hydrate the anhydrous aluminum salt, lixiviating the hydrated mass and recovering aluminum and potassium compounds from the lixivium.

2. A process of treating greensand which comprises separating the same into fractions consisting essentially of glauconite and sand respectively, adding to the glauconite fraction an acid material containing the $SO_4$ radical, allowing the mixture to stand until at least a material proportion of the aluminum, the potassium and the iron present have been converted into sulfates, heating the mass to the temperature of decomposition of ferric sulfate, thereafter adding water and keeping the mass moist for a sufficient time to hydrate the anhydrous aluminum salt, lixiviating the hydrated mass and recovering aluminum and potassium compounds from the lixivium.

3. A process of treating greensand which comprises separating the same into fractions consisting essentially of glauconite and sand respectively, adding to the glauconite fraction a mineral acid capable of reacting with aluminum, postassium and iron therein, allowing the mass to stand in a warm state until at least a material proportion of the aluminum, potassium and iron present have been converted into soluble salts, heating the mass to a temperature capable of eliminating the bulk of the soluble iron salts, but not sufficient to decompose the soluble potassium and aluminum salts, and subjecting the mass to the action of water for the removal and recovery of the aluminum and potassium compounds.

4. A process of treating greensand which comprises tumbling the dry material until the bulk of the glauconite constitutent has been reduced to a fine powder, separating said powder from the coarse sand, treating the said powder with sulfuric acid of about 66° Bé., and allowing the same to stand whereby the acid reacts with the major portion of the iron, aluminum and potassium present to form sulfates, heating the mass to about 600° C. in a muffle, quenching the heated mass in water, keeping the mass wet for several weeks and lixiviating with hot water.

5. A process of treating glauconite material, which comprises subjecting the same to the slow action of strong sulfuric acid for a sufficient time for a large part of the potassium, iron and aluminum therein to be converted into sulfates, heating the mass to between 500 and 750° C., quenching in water and keeping the mass wet until the aluminum sulfate is substantially all hydrated, and lixiviating with hot water, whereby iron oxid in a form suitable for use as pigment and a solution containing potassium and aluminum sulfates are produced.

6. A process which comprises subjecting the glauconite fraction only of greensand, in the substantial absence of the sand thereof, to the action of a strong mineral acid capable of reacting therewith.

7. A process of treating greensand which comprises separating the major portion of the glauconite from the major portion of the sand, reacting upon the glauconite fraction with an acid material containing the $SO_4$ radical, heating the product of such reaction sufficiently to substantially insolubilize the iron content, and subsequently dissolving potassium and aluminum salt from the heated material only.

8. A process which comprises subjecting the glauconite fraction only of greensand, in the substantial absence of the sand thereof, to the action of sulfuric acid.

In testimony whereof I hereunto affix my signature.

EDWARD HART.